Jan. 13, 1970  A. BIGELMAIER ET AL  3,489,497
DEVICE FOR MEASURING THE REPRODUCTION PROPERTIES OF
OPTICAL SYSTEMS
Filed June 1, 1966  4 Sheets-Sheet 1

ANTON BIGELMAIER
KLAUS DIETER SCHAEFER
HEIKO WASMUND

INVENTORS

BY Rauber & Lezar

ATTORNEYS

Jan. 13, 1970  A. BIGELMAIER ET AL  3,489,497
DEVICE FOR MEASURING THE REPRODUCTION PROPERTIES OF
OPTICAL SYSTEMS
Filed June 1, 1966  4 Sheets-Sheet 2

ANTON BIGELMAIER
KLAUS DIETER SCHAEFER
HEIKO WASMUND
INVENTORS

BY Rauber & Lazar
ATTORNEYS

ANTON BIGELMAIER
KLAUS DIETER SCHAEFER
HEIKO WASMUND
INVENTORS

BY Rauber & Lazar
ATTORNEYS

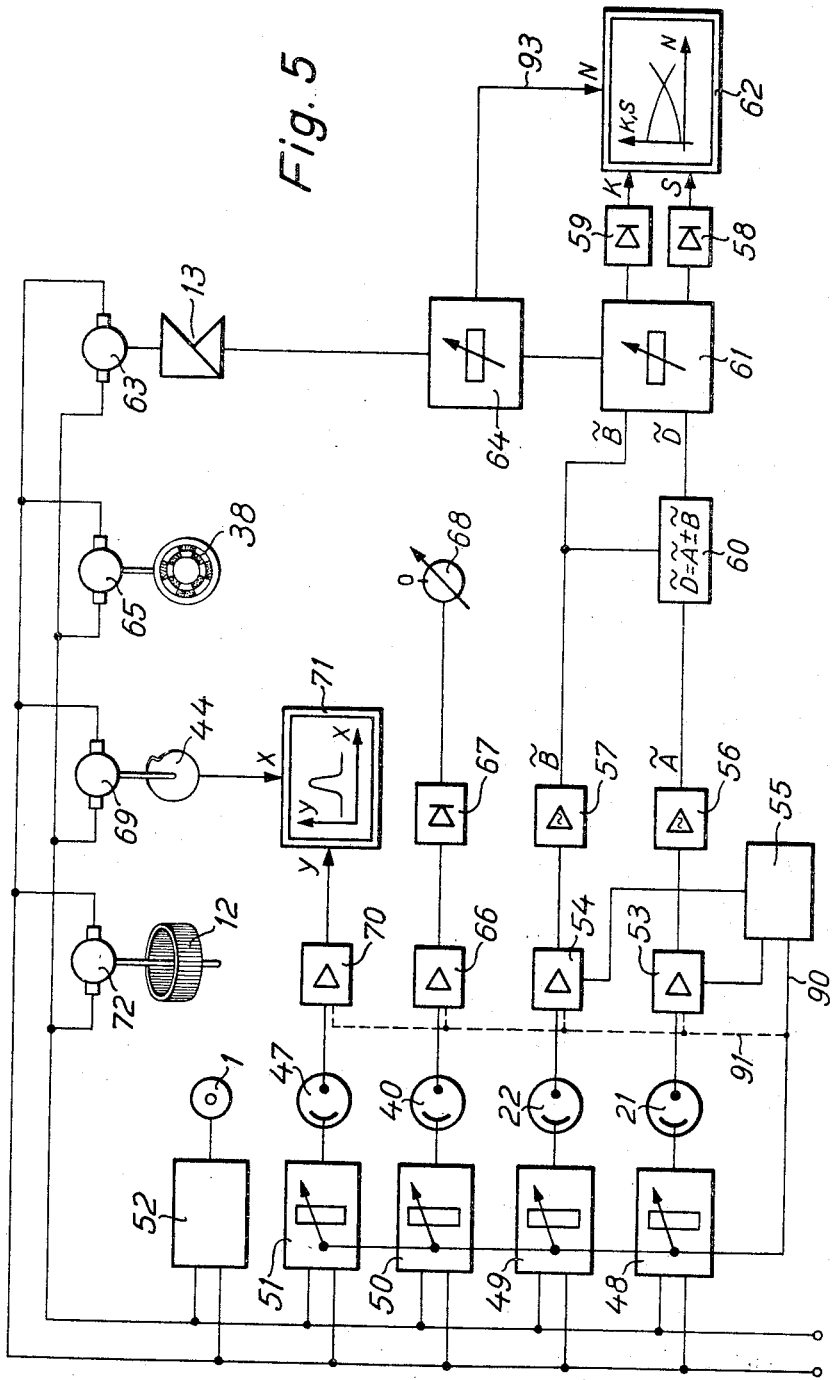

3,489,497
DEVICE FOR MEASURING THE REPRODUCTION PROPERTIES OF OPTICAL SYSTEMS
Anton Bigelmaier, Klaus Dieter Schaefer, and Heiko Wasmünd, Wetzlar, Germany, assignors to Ernst Leitz, G.m.b.H., Wetzlar (Lahn), Germany, a corporation of Germany
Filed June 1, 1966, Ser. No. 554,510
Claims priority, application Germany, June 5, 1965
L 50,864, Patent 1,231,925
Int. Cl. G01b 9/00
U.S. Cl. 356—124
12 Claims

ABSTRACT OF THE DISCLOSURE

A system for measuring the reproduction properties of optical systems by transmitting the illuminated projection of a narrow slit through the optical system (lens) under test. The object slit is split into two separate rays which are projected on a rotating grating and then to photo-electric cells the output of which is evaluated for the contrast transfer function by an analogue computer and recorder.

---

The invention relates to a device for measuring reproduction properties of optical systems by determination of the contrast transfer function.

It is already known how to determine from two mutually independent measurements, by linear combination, the real and/or imaginary portion of the contrast transfer function. A device has already also been proposed where the generation of a variable spatial frequency (N) is effected in that an object slit is reproduced by the optical system to be tested on a selected slit which is oriented normal to the intensity distribution of the slit image of the object slit. By means of another optical system the selection slit is reproduced through a turning prism on a rotating drum which presents a slit grating with the grating constant $N_0$. Between the variable spatial frequency, N, the angle of rotation $\alpha/2$ of the turning prism, and the grating constant $N_0$ there exists the relation $$N = N_0 x \sin \alpha$$

Behind the rotating grating, the known device has a multiplier which transforms the intensity passing through the grating into an electrical quantity and supplies it to a selective amplifier to filter out the fundamental wave. The amplitude variation of the fundamental wave is proportional to the sine contrast transfer function modified by a known correction factor. The correction factor depends on the finite width of the object slit and the oblique position of the image of the selection slit on the grating drum. The correction factor is:

$$k(\alpha) = \frac{\sin(h\pi N_0 \cos \alpha)}{\cos \alpha \sin(\pi N_0 h)} \cdot \frac{\sin(\pi S N_0 \sin \alpha)}{\pi S N_0 \sin \alpha}$$

where $\alpha$ is the angle between the slits on the grating drum and the image of the selection slit;
$h$ is the width of the ideal (aberration free) image of the object slit;
$S$ is the width of the selection slit; and
$N_0$ is the constant spatial frequency of the grating on the rotating drum.

The object of the present invention is to provide a device which permits the determination of the contrast transfer function simply. For this purpose the above described device is modified according to the invention in that between the turning-prism and the drum with the slit grating, there is provided a ray divider and optical deflecting means, which serve to produce on the grating drum, spatially separated and oppositely oriented two images of the selection slit. Further, each of these slit images has assigned to it a photoelectric receiver with following amplifier and filters for the production of electric partial signals. Further, electric circuit means are produced for the analog computation of the determinants of the contrast transfer function from the partial signals. In an advantageous embodiment of the invention there are assigned to the ray divider in one partial ray path an additional, fixed, turning-prism with an angle of rotation of 180 degrees, in the other partial ray path, a plane plate of the same optical thickness, in such a manner that the centers of the light intensity distribution of the partial images fall on the same bright-dark edge of the grating of the grating drum.

In another advantageous embodiment of the invention, the ray divider is followed by deflecting mirrors, by which the partial images are reproduced on opposite zones of the grating drum, in such a manner that centers of the light intensity distribution of the two partial images fall simultaneously on bright-dark edges of the grating. For the displacement of the turning-prism arranged after the selection slit, a motor may be provided, which advantageously is coupled to a sine potentiometer whose tap controls the abscissa of a coordinate recorder or of an oscilloscope.

It is desirable to provide in the computer following the photoelectric receivers, a computing member in which a sum and/or a difference signal is formed from the electric partial signals in manners well known in the art.

According to the invention, a motor provided for the displacement of the turning-prism is coupled with at least one correction potentiometer, by means of which the correction factor $k$ described above is taken into consideration in the partial signals or in the sum and/or difference signal. These corrected signals can advantageously be fed to ordinate input of a coordinate recorder or oscilloscope.

Instead of a slit diaphragm as the selection slit, there may be provided a pointed edge of an equilateral deflecting prism, polished down to the desired slit width, the sides of which prism are mirror-coated. When using such a deflecting prism, it is advantageous to supply the light of the intensity distribution of the slit image, deflected by one prism side to a device for finding the center of the light distribution as known in the art. It is particularly favorable to guide the light deflected by the other prism side on a photometric device using a movable slit also well known in the art. The signal produced by such a photometric device can be used for the control of a synchronous recorder to furnish the so-called slit image profile, i.e, the so-called line spread function.

For the sensitivity regulation of the photoelectric receiver, and hence for the compensation of any photoelectric current fluctuations, it is desirable to compare the D.C. voltage component of at least one of the partial signals with a standard voltage and to feed the signal obtained from this comparison back to the power supply unit of the photoelectric receivers and/or the amplifier following the multiplier. Accordingly, the standardization of the contrast transfer function is maintained constant without additional measurement.

According to another embodiment of the invention, there is arranged between the image plane of the optical system to be tested and the selection slit or, respectively, the equivalent deflecting prism, an axially rotatable turning-prism by which the slit image can be oriented on the selection slit in such a way, that object slit 3 and selection slit 10 are crossed. This is particularly advantageous for measurement in different azimuths.

In the attached drawing several embodiments of the invention are illustrated in conjunction with the description which follows, in which:

FIG. 5 is an electric circuit arrangement when using the optical components illustrated in FIG. 4.

Figure 1:
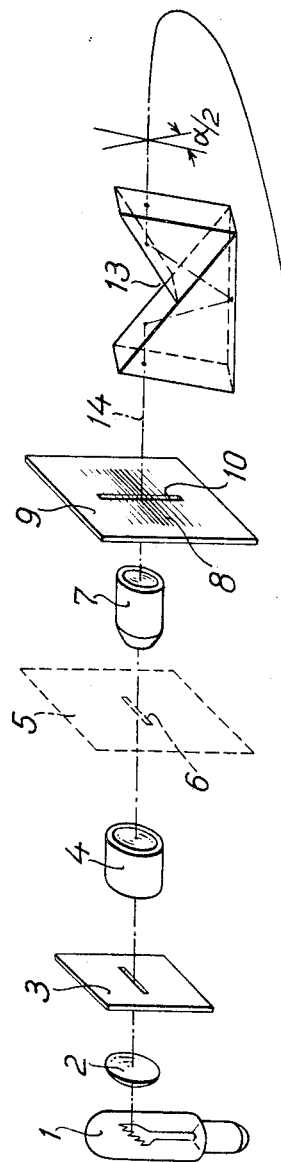
FIG. 1 is a schematic of the electro-optical system of one embodiment.
Figure 1:
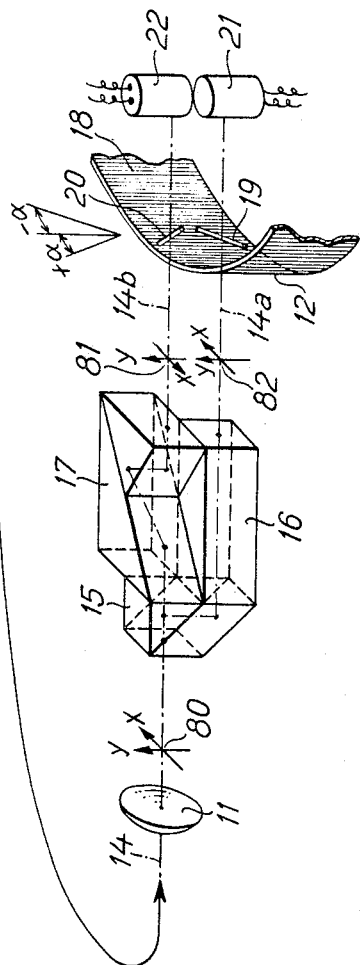

In FIG. 1, an object slit 3 is illuminated by a light source 1 through a lens 2. The optical system 4 to be tested reproduces the object slit 3 on the specimen plane 5 as slit image 6. The slit image 6 is reproduced through the micro-objective lens 7 as a greatly enlarged slit image 8 on a slit diaphragm 9 normal to the slit image 8 which cuts out of the slit image 8 the strip 10. The intensity distribution of the slit image 8 is not changed thereby. The slit image strip 10 is reproduced through a lens 11 on a grating drum 12. Between the selection slit 9 and lens 11 there is disposed a turning-prism 13, which is rotatable about the optical axis 14. A ray divider 15 is placed between lens 11 and the gating drum 12.

A pencil of light rays passing through the ray-dividing prism 15 is divided and altered from the vector orientation of the X–Y components of the incoming pencil as indicated by the vector schematic 80 on axis 14 to those on output optical axes 14b and 14a as vector schematics 81 and 82 respectively. The divided pencil along axis 14a is unaltered after passing through divider 15 and a plane plate 16. The other divided pencil, however, is altered by an Abbé-Konig prism 17 after passing through the ray divider 15. Accordingly, the X component of the passing pencil of rays is rotated by 180 degrees as shown in diagram 81.

If the turning-prism 13 is rotated by an angle $\alpha/2$, as indicated at 83 (before lens 11), then the slit image strip 10 is rotated by the reflected pencil of rays by the angle $+\alpha$ reproduced as partial image 20 on the grating drum 12, but rotated as partial image 19 by the passing pencil of rays by the angle $-\alpha$. As has been explained above, the effective spatial frequency N varies as a function of the angle of rotation $\alpha$. For alpha equal to zero degrees, the partial images 19 and 20 of the slit image strip 10 are oriented parallel to the webs 18 of the grating drum 12. Consequently the effective spatial frequency N equals zero. But if the partial images 19 and 20 of the slit image strip 10 are oriented normal (perpendicular) to the webs 18, then the effective spatial frequency N is equal to the constant spatial frequency $N_o$ of the grating drum 12.

The light passing through the rotating grating drum 12 falls on the photomultipliers 21, 22. The A.C. voltages furnished by these multipliers are supplied to an electric evaluating device (not shown). Grating drum 12 is driven by a motor 72 as shown in FIG. 5.

According to the system just described and illustrated in FIG. 1, the optical axis 14a of the reflected and the optical axis 14b of the transmitted pencil of rays coincide. If the center of light distribution of the slit image strip 10 coincides with the optical axis 14, the centers of the light distributions of the partial images 19 and 20 will fall on the same bright-dark edge of the webs of the rotating grating drum 12 at the same time. It is noted that the orientation of the effective components of images 19 and 20 of the selection slit image strip 10 is opposite.

Figure 2:
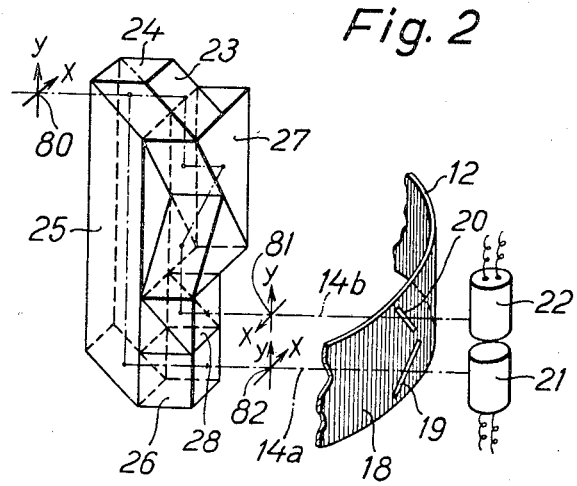
FIG. 2 is a variant of the ray divider device of the system with following turning-prism or plane plate.

In the arrangement according to FIG. 1, the ray divider 15, the plane plate 16, and the Abbé-Konig prism 17 are so arranged that the photomultipliers 21 and 22 must be located inside the grating drum 12. This arrangement can therefore be used only if there is enough space for the photomultipliers inside the grating drum 12. In FIG. 2, a ray division system is shown where the photomultipliers can be arranged outside the grating drum 12. The ray division system consists of a ray divider prism 23 with the partially transmitting surfaces 24, prism 25 and 26 for the reflected pencil of rays, and an Abbé-Konig prism 27 as well as a prism 28 for the passing pencil of rays. The optical properties of this system and the effect on the pencil of rays are the same as those of the system shown in FIG. 1.

Figure 3:
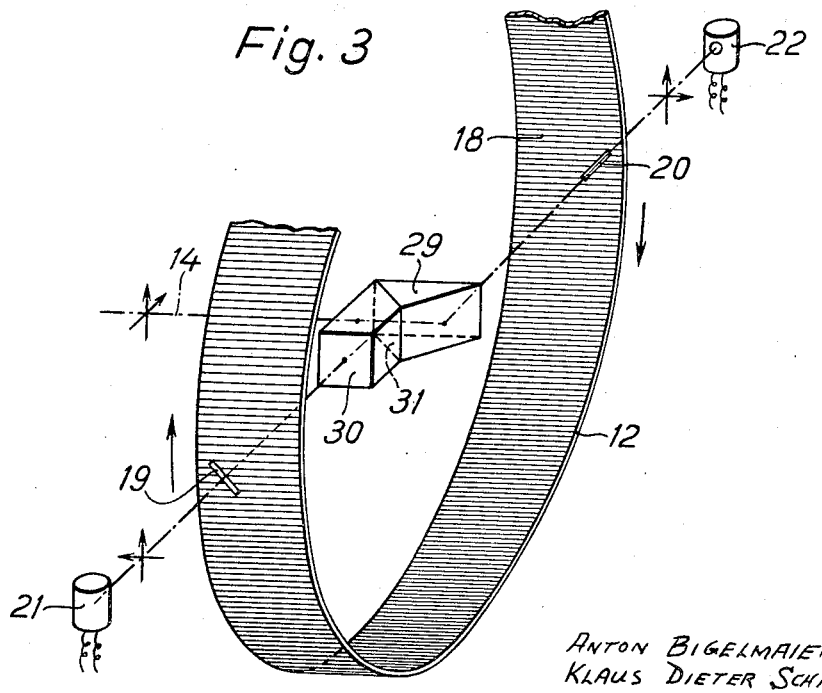
FIG. 3 is another variant of the ray divider device.

In FIG. 3 is shown a ray division system through which the light distribution strips 19 and 20 are reproduced on opposite zones of the grating drum 12. A prism 29 and a prism 30 are arranged as shown and include a partially transmitting surface 31. When using this system, care must be taken that the centers of the light distributions of the partial images 19 and 20 fall simultaneously on opposite bright-dark edges when the intense light center of the slit image strip 10 coincides with the optical axis 14. Further, it is noted, the photomultipliers 21 and 22 are disposed outside the grating drum 12. Otherwise, the system functions as that of FIG. 1.

Figure 4:
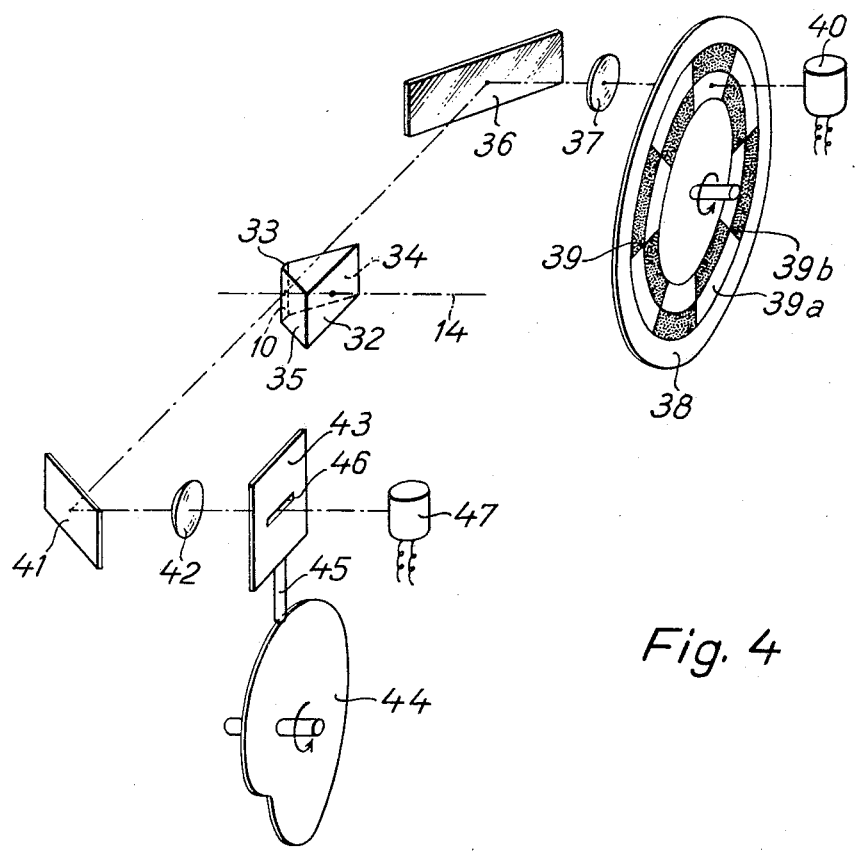
FIG. 4 is a schematic of the optical components of a system with the use of a deflecting prism instead of a slit diaphragm as the selection slit.

FIG. 4 illustrates another advantageous embodiment of the system. For this embodiment the slit diaphragm with the selection slit 9 according to the embodiment of FIG. 1 is supplemented by an equilateral prism 32, whose pointed edge is polished down as flat surface 33 to the width of the selection slit 10 of FIG. 1. The sides 34 and 35 of the prism 32 are mirror-coated. The enlarged central part of slit image 8 projected on selection slit 9 passes through prism 32, along axis line 14, and is reproduced on the grating drum 12 as described. The light reflected on side 34 of prism 32 produces via mirror 36 through lens 37 on a rotating disk 38 provides with a sector pattern 39, a slit image which is alternately covered by an outer sector strip 39a and an inner sector strip 39b. The signals picked up by the photomultiplier 40 are utilized for the indication of the center of the light distribution.

The light reflected on side 35 of prism 32 produces via mirror 41 through lens 42 a slit image on a slit-holder 43. The slit-holder 43 with slit 46 is controlled variable in position by a pin 45 riding on the surface of cam plate 44. A photomultiplier 47 arranged behind the slit-holder 43 responds to the signal which is proportional to the intensity distribution of the slit image strip 33, i.e. the so-called line spread function.

FIG. 5 is an electrical block diagram of the testing device of FIG. 4. To each of the photomultipliers 21, 22 (FIG. 1), 40, 47 (FIG. 4) there is assigned a power supply unit 48, 49, 50, 51 and to the light source 1, a current-stabilized power supply unit 52. Spatial frequency dependent signals A(N) and B(N) being the output of the photomultipliers 21 and 22 are amplified by amplifiers 53, 54 and filtered into their D.C. and A.C. voltage components. The D.C. voltage components of these signals are compared with the standard voltage 55. Any resulting D.C. difference voltages are fed back along path 90 to the power supply units 48, 49, 50 and 51 for sensitivity regulation. Such regulation can be obtained, if desired, by feed-back of the difference voltages to the amplifiers 53, 54, 66 and 70, as indicated in broken lines 91.

From the A.C. voltage components of the signals A(N) and B(N), the fundamental waves $\bar{A}$ and $\bar{B}$ are filtered out by selective amplifiers 56, 57. In a circuit network component 60, either the difference or the sum of the two signals $\bar{A}$, $\bar{B}$ is produced and fed to a correction potentiometer 61, arranged as a double potentiometer. In addition, the fundamental wave $\bar{B}$ itself also is supplied to correction potentiometer 61. It is the function of the correction potentiometer 61 to supply the above-mentioned correction factor $k(\alpha)$ to the signals. Following the correction potentiometer 61 are rectifiers 58, 59, which provide output signals $\bar{D}(\bar{\Sigma})$ and $\bar{B}$, respectively. From the signal $\bar{B}$ there is rectified a signal K and from $\bar{D}$ a signal S representing the imaginary portion (from $\bar{\Sigma}$ the real portion C) of the contrast transfer function. These voltages, K and S (or respectively C), are applied as the ordinate input of a coordinate recorder 62 or, alternatively, an oscilloscope.

Signals K and S (or C) supplied to the coordinate recorder or oscilloscope 62, are dependent on the spatial frequency controlled by the position of the revolving or turning-prism 13. The displacement of the revolving prism 13 is effected by a motor 63, which, in addition, controls a sine potentiometer 64 and the correction potentiometer 61 as a function of the spatial frequency N. A voltage of the sine potentiometer 64, proportional to the spatial frequency N, is applied to the abscissa input of the coordinate recorder or oscilloscope 62 along path 93. Upon rotation of the turning-prism 13 by 45 degrees, there are recorded, therefore, the amount and the imaginary portion (or real portion) of the contrast transfer function between $N=O$ and $N=O_0$.

The disk 38 (FIG. 4) is driven by a motor 65. The photomultiplier 40 following disk 38 furnishes, for the sector strips 39a and 39b, A.C. voltage signals, which are processed in the amplifier 66 and the rectifier 67, the output of which signal is indicated on a meter 68. When adjusting or calibrating the center of the light intensity distribution in the slit image strip 10, the optical system 4 to be tested, the equilateral prism 32, and all structural parts of the three measuring channels following prism 32 are adjusted in height until the deflection in meter instrument 68 becomes zero. By this adjustment of the center of the light distribution, the linear portion of the exponential series development of the contrast transfer function disappears, which adjustment, therefore, is equivalent to the usual standardization of the contrast transfer function.

The cam plate 44 (FIG. 4) is driven by a motor 69. As shown in FIG. 4, the cam 44 controls, by pin 45, the position of slit 46 of the slit-holder 43. The light signal applied to photomultiplier 47 is amplified by a D.C. amplifier 70 and controls the Y deflection of the synchronous recorder 71, having a paper feed which is synchronized with the angle of rotation of the cam plate 44. Thus the intensity variation of the slit image, i.e., the line spread function, is recorded in the synchronous recorder 71.

What we claim is:

1. A device for measuring the reproduction properties of optical systems including:
    (a) an optical system under test (4);
    (b) an object slit illuminated by a light source (1);
    (c) a selection slit (10) placed in a plane (9) optically conjugate with said object slit and orientated perpendicularly to the image of said object slit produced by the optical system under test;
    (d) a grating drum (12) arranged in a plane optically conjugate with the plane of said selection slit (9);
    (e) a rotatable prism (13) arranged along the optical axis following said selection slit (9); and
    (f) transducer means (22, 21) following said grating drum (12) responsive to light rays passing through said drum to produce representative electric signals; characterized by
    (g) a light ray divider (15) and optical deflection means (16 and 17) positioned between said rotatable prism (13) and said grating drum (12) to divide the image of said selection slit in spatially separated and oppositely oriented slit images (19 and 20) on said grating drum, said deflection means including:
        a fixed prism (17) adapted to rotate one of said partial light ray slit images by 180 degrees, and
        a plane plate (16) having an optical thickness the same as the optical thickness of said fixed prism for carrying the other partial light ray slit image, said fixed prism and plane plate positioned so that the centers of the light distributions of the two partial slit images fall on the same bright-dark edge of said grating drum; and
    (h) electric circuit computer means responsive to said electric signals for producing analog computations of the determinants of the contrast transfer function from said separated images.

2. A device according to claim 1 wherein a motor (63) is arranged for rotating said rotatable prism (13).

3. A device according to claim 2 characterized by a sine potentiometer (64) and a coordinate recorder, said potentiometer being simultaneously driven by said motor in synchronism with said rotatable prism (13) and the tap of said potentiometer controls the abscissa of a coordinate recorder (62).

4. A device according to claim 3 characterized by computer means (60) responsive to said electric signals (A, B) for producing a combined signal (D) representing the sum or difference of said electric signals.

5. A device according to claim 4 characterized by a correction potentiometer (61) simultaneously driven by said motor (63) in synchronism with said rotatable prism (13), the input of said correction potentiometer responding to one (B) of said electric signals and said combined signal (D) to produce resultant signals (K, S) corrected free of the dimension of said object slit (3) and of the errors caused by the angular orientation of an image on said grating drum (12).

6. A device according to claim 5 characterized in that said resultant signals (K, S) are applied as input signals to the ordinate input of said coordinate recorder (62).

7. A device according to claim 1 characterized by an equilateral deflection prism (32) having its apex edge polished to a flat rectangular surface (33) having a width corresponding to the width of said selection slit (10) and having mirrored sides (34, 35), said polished edge acting as said selection slit.

8. A device according to claim 7 characterized by means responsive to light signals reflected by one of said mirrored surfaces for indicating the center of the light intensity distribution of the slit image formed by the optical system under test.

9. A device according to claim 9 characterized in that said means responsive to said deflected light signals includes a photoelectric transducer (40, 47).

10. A device according to claim 7 characterized by a motor driven photometric slit (46), a photomultiplier (47) and means coupling the signal from said photomultiplier to a synchronous recorder (71) by which means the intensity distribution of said slit image formed by the optical system under test may be plotted.

11. A device according to claim 1 characterized by means (55, 90, 91) responsive to said photoelectric transducers (21, 22) and/or the following circuit means (53, 54) for regulating the sensitivity of said devices by comparison of the D.C. component of the signals with a fixed reference signal.

12. A device for measuring the reproduction properties of optical systems including:
    (a) an optical system under test (4);
    (b) an object slit illuminated by a light source (1);
    (c) a selection slit (10) placed in a plane (9) optically conjugate with said object slit and oriented perpendicularly to the image of said object slit produced by the optical system under test;
    (d) a grating drum (12) arranged in a plane optically conjugate with the plane of said selection slit (9);
    (e) a rotatable prism (13) arranged along the optical axis following said selection slit (9); and
    (f) transducer means (22, 21) following said grating drum (12) responsive to light rays passing through said drum to produce representative electrical signals; characterized by (g) a light ray divider (31) and optical deflection means (29 and 30) positioned between said rotatable prism (13) and said grating drum (12) to divide the image of said selection slit in spatially separated and oppositely oriented slit images (19 and 20) on said grating drum, said deflection means characterized by deflection surfaces of a pair of complementary prisms (29, 30) arranged to reproduce said separated slit images on opposite zones of said grating drum and in such a way that the centers of the light distributions fall simultaneously on bright-dark edges of said grating drum; and (h) electric circuit computer means responsive to said electric signals for producing analog computations of the determinants of the constant transfer function from said separated images.

References Cited

UNITED STATES PATENTS

| 1,838,971 | 12/1931 | Whitaker et al. | 350—286 |
| 2,958,783 | 11/1960 | Taylor | 250—236 |

FOREIGN PATENTS

| 821,599 | 10/1959 | Great Britain. | |

OTHER REFERENCES

H. H. Hopkins, "The Application of Frequency Response Techniques in Optics," Proc. Phys. Soc., 1962, vol. 79, pp. 912–914.

H. H. Emsley, "Reflecting Prisms," The Optician, 1962, vol. 143, pp. 535–538.

RONALD L. WIBERT, Primary Examiner

J. ROTHENBERG, Assistant Examiner